Sept. 17, 1935.  A. V. ALM  2,014,460
COMPOSITE SHEET MATERIAL
Original Filed Feb. 14, 1930
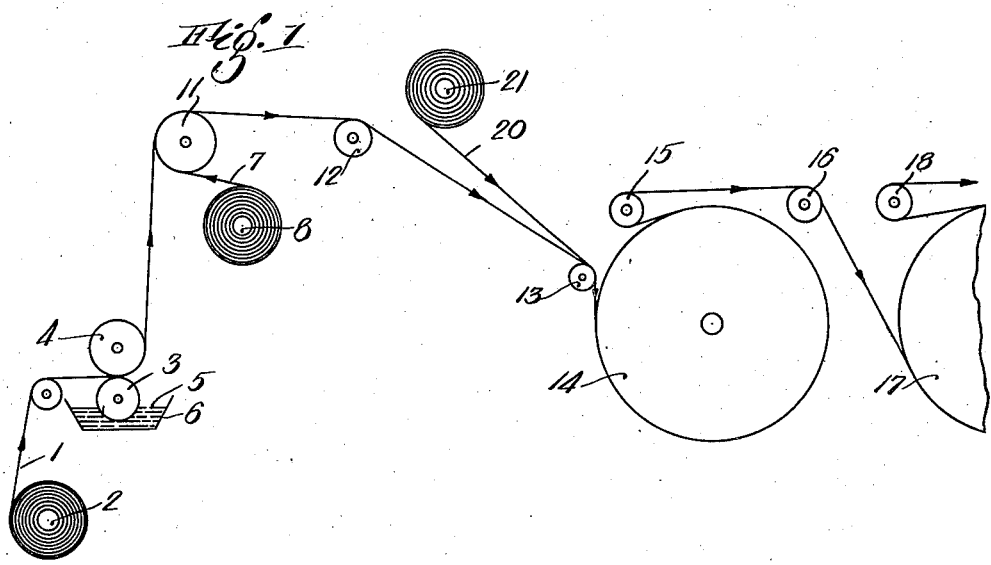
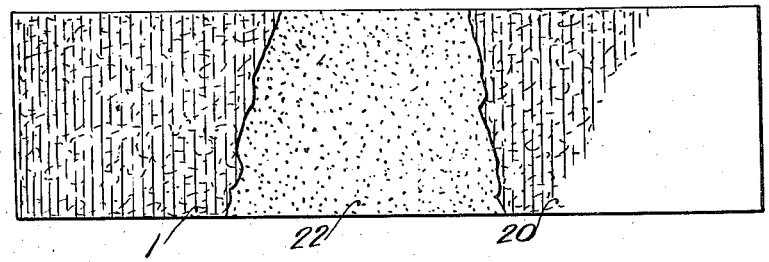
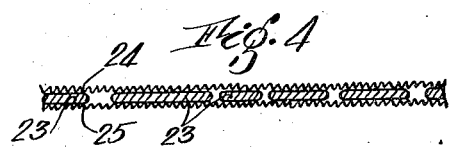
Inventor
Alexander V. Alm.
By Roberts Cushman & Woodberry
his Attorneys.

Patented Sept. 17, 1935

2,014,460

UNITED STATES PATENT OFFICE 2,014,460

COMPOSITE SHEET MATERIAL

Alexander V. Alm, Marblehead, Mass., assignor to Dennison Manufacturing Company, Framingham, Mass., a corporation of Massachusetts Application February 14, 1930, Serial No. 428,338
Renewed February 5, 1935

9 Claims. (Cl. 154—46)

This invention relates primarily to sheet materials, characterized by having a flexible and stretchable, elastic structure such as crepe paper, and has for an object the reinforcing of such materials while preserving their flexibility, elasticity, and softness of texture.

In the art of paper manufacture and treatment of similar sheet materials, various means have heretofore been proposed for strengthening or reinforcing the finished sheet. Such means have been commonly applied to non-extensible sheet materials such as ordinary paper, cardboard and the like. However, with materials which are not only soft and pliable but also extensible in one or more directions throughout the sheet, such as crepe paper, the practices heretofore employed are not applicable because they destroy the principal properties of the material itself, such as flexibility, stretchability and elasticity. For example, it is known to glue or paste a sheet of crepe paper to a sheet of stronger material in order to give the paper the advantage of the greater strength of the reinforcing material. But glues and similar adhesives heretofore employed tend to form a rigid and more or less brittle layer, which stiffens the sheet and is itself subject to fracture and loss of adhesion when subjected to stress or stretch. These and like water-soluble materials also penetrate the paper and may leave stains or have other deleterious or harmful effects thereon.

The present invention overcomes these objections and provides a reinforced yet soft, flexible and elastic composite sheet from a facing of elastic material such as crepe paper and a supplementary flexible backing sheet which may also be elastic, such as a second sheet of crepe paper, by employing an intervening connecting layer comprising a suspension or emulsion of adhesive, plastic (but preferably elastic and water insoluble) particles, such as rubber latex. The materials as thus secured firmly together produce a stretchable and elastic composite sheet in which the adhesive connecting layer will remain freely stretchable and elastic and at the same time retain its adhesive relationship to the other two sheets. The resulting composite sheet consequently remains flexible and of soft texture, extensible without rupture, up to the ultimate breaking strength of the materials, and at the same time elastic so that it will return to its original shape and dimensions unless it is excessively strained and distorted. While the sheets are referred to as facing and backing sheets, it is to be understood that the backing sheet may nevertheless be decorative as well as the facing sheet.

In the general practice of the invention, the backing sheet or the facing sheet (or both) is coated with an emulsion of rubber latex of suitable consistency and then brought into adhesive face contact with the other, and allowed to dry if necessary. The latex may be the ordinary fresh latex or, preferably, that which has been preserved by the addition of suitable reagents such as ammonia, etc., or it may be suitably treated for the acquisition of special properties so long as such treatments do not induce premature coagulation or interfere with its spreading, wetting and adhesive qualities, to such extent as these qualities are relied upon for the specific purposes in view. Aqueous dispersions of rubber, of equivalent properties, may also be used instead of latex. The emulsion or suspension is preferably of a freely fluid, liquid consistency for thorough wetting of the sheet or for producing a substantially continuous film. But it is also to be understood that it may be prepared in more concentrated condition, and applied either as a continuous film or so as to wet the sheets in spots, such as the ridge portions of the paper, if a still more flexible and stretchable composite sheet is required.

Whether the latex is applied to the backing sheet or to the facing sheet, or both, it is used preferably in a freely flowing liquid condition in order to wet and penetrate the surfaces uniformly and quickly; but it may be first allowed to dry to some extent, thereby to increase its concentration of solids and its viscosity. This is especially recommended if the latex is dilute or if either of the materials used is adversely affected by water. It is also advisable if a thicker layer of latex is desired. Thick layers may also be provided by partially drying the first coating and then applying a second coating of rubber latex upon the first and repeating until the required thickness is attained.

When the adhesive layer is of the requisite consistency and properly applied, which will be readily determined under any given circumstances and in view of the result to be obtained, the sheets of paper are brought into firm face contact and pressed together sufficiently to promote satisfactory adhesion.

If the latex is very dilute the water content may filter out into the sheet material leaving the rubber solids upon the surface to which they adhere, at the same time coalescing to such extent as the nature of their distribution will permit, and form a continuous or discontinuous adhesive layer therebetween, as the case may be.

The composite sheet is then dried, if necessary, and is ready for use.

A typical instance of the application of the invention will be described with reference to a crepe paper facing and a second sheet of crepe paper, similar to the first, as a backing reference being made to the accompanying drawing in which:

Fig. 1 is a diagrammatic side elevation of apparatus suitable for carrying out the process of the invention;

Fig. 2 is a view of the finished composite sheet showing layers of crepe paper, rubber latex and crepe paper, parts of the two upper layers being broken away;

Fig. 3 is an enlarged cross sectional view of the sheet shown in Fig. 2, exaggerated with respect to the latex layer;

Fig. 4 is a similar cross section of a modification of the composite sheet shown in Fig. 3, in which the latex layer is discontinuous, in small patches or droplets.

As shown in the drawing, Fig. 1, a sheet of crepe paper 1 may be drawn from a roll at 2 and passed between rollers 3, 4, of which the lower roll 3 dips into a supply of latex emulsion 5 in the tank 6. In this manner a uniform and relatively thin coating of latex may be applied to the under surface of the sheet and uniformly distributed thereover as the sheet and emulsion coating passes through the nip of the rollers. Heavier compression may be applied at this point to force the latex into the sheet. Or, if a thick or saturating coating of emulsion is desired, the sheet may pass through the emulsion below the rollers, wetting one or both surfaces to such extent as the emulsion will adhere thereto. If this is too great, surplus latex may then be expressed, as by passing the wet sheet between the rollers under compression.

The latex-coated or impregnated backing sheet is next passed into contact with a sheet of crepe paper 7 from roll 8. If but one side of the backing sheet has been coated, the sheets may pass over roller 11 and guide rollers 12 and 13, respectively and directly to the drying drum 14. If both sides of sheet 1 have been coated, a second sheet of crepe paper 20 may be applied to the upper surface from roll 21. In either case, the composite sheet as thus produced may then be passed over a heated drying drum 14 and thence over guide rollers 15, 16, to a second drying drum 17, and finally over guide roller 18 to any suitable take up mechanism (not shown) where it is sufficiently dry to be formed into rolls or otherwise. As thus made, the crepe paper sheet is firmly secured to the backing, the outer surfaces of both having their original characteristics. Likewise if three sheets are combined, both sides of the inner sheet are joined to the outer sheets, and the latter continue to present their original characteristics.

The adhesive may form a continuous film or layer 22 as in Fig. 3 or a discontinuous layer of dispersed areas or drops 23, as shown in Fig. 4, depending upon the amount and combination of the latex used. A sheet of strong crepe paper (such as kraft paper) may likewise be employed as the backing, or as the reinforcing middle sheet in the three-ply composite sheet above described.

It will be noted that the ridge portions 24, 25 of the crepe paper (Fig. 3) are adhesively secured to the latex layer and still remain free to rotate and expand and contract substantially independently, upon flexion and stretching of the sheet. This, in addition to the elasticity of the adhesive layer, provides a wide range of expansibility and distortion, far greater than that ordinarily exhibited in laminated materials, without separation, rupture or tearing of the sheets. This is especially effective when the latex is applied in a discontinuous layer of globules as indicated in Fig. 4. This effect may positively be accomplished by using a roll 3 having a discontinuous surface for application of the latex, but to a degree, also represents the condition of a continuous film of emulsion, after drying the dispersion medium. It will also be understood that the latex layer or deposit need not be confined to the ridge portions but may substantially fill the folds or troughs therebetween.

The ridges of the two crepe paper sheets, as thus superposed, may be disposed in parallel, in which case the extensibility of the composite sheet remains substantially unreduced, and the flexibility and softness of the sheet is maintained even though the composite sheet is of double thickness and strength. If the corrugations or ridges in the two sheets are disposed in opposition to each other, the extensibility will be reduced somewhat but the composite sheet will still be flexible and soft and also of increased toughness.

It is also accomplished by the present invention to provide a composite crepe paper sheet in which the colors or designs upon the two sides may be varied at will by suitably selecting or coloring and printing the individual crepe sheets from which the composite sheet is made.

Other combinations will occur to those familiar with the art upon adaptation of the invention to specific purposes and conditions.

I claim:

1. Composite sheet material characterized by having a sheet of crepe paper and a backing, joined together by an intermediate layer of adhesive elastic rubber.

2. Composite sheet material comprising a backing, a layer of crepe paper having ridges thereon, and an intermediate layer of adhesive elastic rubber joined to the backing and to the ridges of the crepe paper.

3. Composite sheet material comprising two sheets of crepe paper, attached by an intermediate layer of adhesive elastic rubber.

4. Composite sheet material comprising a backing of extensible material and sheets of crepe paper attached to the surfaces of the backing by intermediate layers of adhesive elastic rubber.

5. Composite sheet material comprising two sheets of crepe paper, the surfaces thereof being joined together by a discontinuous layer of adhesive elastic rubber globules.

6. Composite sheet material, comprising two sheets of crepe paper having ridges thereon, the opposed ridges of the crepe paper being attached by an intermediate discontinuous layer of adhesive elastic rubber globules.

7. Composite sheet material, comprising a sheet of crepe paper joined to another sheet of paper by an intermediate discontinuous layer of adhesive globules.

8. Composite sheet material, comprising a sheet of crepe paper joined to another sheet by an intermediate discontinuous layer of adhesive globules, substantially confined to the ridge portions of the crepe paper sheet.

9. Composite sheet material, comprising a sheet of crepe paper and an extensible backing sheet joined together by an intermediate discontinuous layer of adhesive elastic rubber.

ALEXANDER V. ALM.